US012764674B2

(12) United States Patent
Sehgal et al.

(10) Patent No.: US 12,764,674 B2
(45) Date of Patent: Oct. 13, 2026

(54) OBSS PD THRESHOLD ADAPTATION BASED ON ENVIRONMENTAL CONTEXT AND FEEDBACK

(71) Applicant: Samsung Electronics Co., Ltd., Suwon-si (KR)

(72) Inventors: Abhishek Sehgal, Frisco, TX (US); Hao Chen, Allen, TX (US); Boon Loong Ng, Plano, TX (US); Vutha Va, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 363 days.

(21) Appl. No.: 18/531,598

(22) Filed: Dec. 6, 2023

(65) Prior Publication Data

US 2024/0276392 A1 Aug. 15, 2024

Related U.S. Application Data

(60) Provisional application No. 63/445,636, filed on Feb. 14, 2023.

(51) Int. Cl.

*H04W 16/14* (2009.01)
*H04W 52/24* (2009.01)
*H04W 84/12* (2009.01)

(52) U.S. Cl.

CPC ......... *H04W 52/243* (2013.01); *H04W 16/14* (2013.01); *H04W 84/12* (2013.01)

(58) Field of Classification Search

CPC ... H04W 52/243; H04W 16/14; H04W 84/12; H04W 28/06; H04W 52/365; H04W 72/231; H04W 72/232; H04W 16/02

See application file for complete search history.

(56) References Cited

U.S. PATENT DOCUMENTS

| | | | | |
|---|---|---|---|---|
| 10,736,143 | B2 | 8/2020 | Bhanage et al. | |
| 11,357,047 | B2 * | 6/2022 | Pandian | H04W 72/541 |
| 11,943,650 | B2 * | 3/2024 | Sugaya | H04W 16/14 |
| 2014/0153415 | A1 * | 6/2014 | Choudhury | H04B 7/024 370/252 |
| 2017/0105217 | A1 * | 4/2017 | Kwon | H04W 52/245 |
| 2017/0245224 | A1 * | 8/2017 | Barriac | H04W 52/34 |
| 2018/0027573 | A1 * | 1/2018 | Cariou | H04W 52/367 370/329 |
| 2019/0124695 | A1 * | 4/2019 | Seok | H04W 8/005 |
| 2019/0313328 | A1 * | 10/2019 | Ma | H04W 16/02 |
| 2020/0288323 | A1 * | 9/2020 | Silverman | H04W 4/80 |

(Continued)

OTHER PUBLICATIONS

Wilhelmi et al., "Spatial Reuse in IEEE 802.11ax WLANs," Computer Communications, vol. 170, 2021, 41 pages.

*Primary Examiner* — Andrew Wendell

(57) ABSTRACT

Methods and apparatuses for Overlapping Basic Service Set (OBSS) preamble detection (PD) threshold adaptation. A method of wireless communication performed by a station (STA) comprises: determining whether the STA changed an overlapping basic service set (OBSS) packet detection (PD) threshold for spatial reuse (SR); obtaining, based on determining that the STA changed the OBSS PD threshold for SR, feedback information for performance indicators associated with the STA; and updating the OBSS PD threshold for SR based on the feedback information.

20 Claims, 8 Drawing Sheets

(56) References Cited

U.S. PATENT DOCUMENTS

| | | | | |
|---|---|---|---|---|
| 2023/0217258 | A1* | 7/2023 | Monajemi | H04B 17/336 370/252 |
| 2024/0121724 | A1* | 4/2024 | Sehgal | H04W 74/0808 |
| 2024/0154912 | A1* | 5/2024 | Naik | H04L 47/29 |
| 2025/0193718 | A1* | 6/2025 | Oteri | H04W 24/08 |

* cited by examiner

OBSS PD THRESHOLD ADAPTATION BASED ON ENVIRONMENTAL CONTEXT AND FEEDBACK

CROSS-REFERENCE TO RELATED APPLICATION(S) AND CLAIM OF PRIORITY

This application claims priority under 35 U.S.C. § 119(e) to U.S. Provisional Patent Application No. 63/445,636 filed on Feb. 14, 2023, which is hereby incorporated by reference in its entirety.

TECHNICAL FIELD

This disclosure relates generally to throughput and efficiency in wireless communications systems. Embodiments of this disclosure relate to methods and apparatuses for Overlapping Basic Service Set (OBSS) preamble detection (PD) threshold adaptation.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

The IEEE 802.11ax amendment introduces Basic Service Set (BSS) Coloring as a scheme to allow early detection of Overlapping BSS (OBSS) transmission and Spatial Reuse (SR) through an adaptive Clear Channel Assessment (CCA) threshold with Transmission Power Control (TPC) to increase spectral efficiency in dense Wi-Fi deployments. In SR, an STA can transmit in parallel (e.g., simultaneously, although not necessarily synchronously) to other physical layer protocol data units (PPDUs) being transmitted from OBSSs. This is accomplished, in part, by using different CCA thresholds for the BSS medium and the OBSS medium. Specifically, the CCA thresholds used for OBSS packet detection are higher than the CCA thresholds used for BSS packet detection. This enhances channel access and increases transmission opportunities for STAs in a dense network (e.g., that has many APs).

Earlier IEEE 802.11ax amendments have relied on fixed CCA thresholds (e.g., fixed CCA thresholds associated with BSS medium, other fixed CCA thresholds associated with OBSS medium) based on whether an 802.11 preamble has been detected or not to determine if the medium is IDLE or not. For example, for a particular medium (e.g., OBSS medium or BSS medium), the IEEE 802.11ax amendment specifies use two separate CCA thresholds when listening to the medium to determine whether or not it is IDLE.

- One CCA threshold, the preamble detection (PD) threshold, is used to identify any 802.11 preamble transmissions from another transmitting 802.11 radio. The preamble (which is used for synchronization between transmitting and receiving 802.11 radios) is a component of the physical layer header of 802.11 frame transmissions. The PD threshold is statistically around 4 dB signal-to-noise ratio (SNR) for most 802.11 radios to detect and decode an 802.11 preamble. In other words, an 802.11 radio can usually decode any incoming 802.11 preamble transmissions at a received signal at about 4 dB above the noise floor.
- Another CCA threshold, the energy detection (ED) threshold, is used to detect any other type of RF transmissions during the clear channel assessment. The ED threshold is specified to be 20 dB higher than the signal detect threshold.

The IEEE 802.11ax specification defines the PD threshold as −82 dBm and the ED threshold as −62 dBm for a 20 MHz channel, with a 3 dB increment for every doubling of channel bandwidth.

Illustratively, these CCA thresholds are used for sensing a particular medium (e.g., OBSS medium or BSS medium) in the following manner.

- If an 802.11 preamble is detected by an STA in a network, then the STA uses the PD threshold to determine whether or not the medium is IDLE (where preamble with SNR greater than or equal to the PD threshold indicates a non-idle medium, and preamble with SNR below the PD threshold indicates an IDLE medium).
- In the absence of an 802.11 preamble, the STA resorts to using the ED threshold to determine whether or not the medium as IDLE. (where preamble-free RF transmission with SNR greater than or equal to the ED threshold indicates a non-idle medium, and preamble-free RF transmission with SNR below the PD threshold indicates an IDLE medium).

BSS Coloring allows the node to identify the current transmission, based on the BSS color in the PHY header of the incoming transmission, as an inter-BSS or intra-BSS transmission. The STA can then adjust the PD threshold for the inter-BSS transmission and transmit over the ongoing transmission. This mode of operation is called Overlapping Basic Service Set-Packet Detect (OBSS_PD) based SR. If the node ignores the inter-BSS transmission based on OBSS_PD based SR, the spec dictates that the node reduce the transmit power based on the OBSS_PD threshold chosen.

SUMMARY

Embodiments of the present disclosure provide methods and apparatuses for OBSS PD threshold adaptation based on environmental context and feedback.

In one embodiment, a method of wireless communication performed by a station (STA) is provided, including the steps of: determining whether the STA changed an overlapping basic service set (OBSS) packet detection (PD) threshold for spatial reuse (SR); obtaining, based on determining that the STA changed the OBSS PD threshold for SR, feedback information for performance indicators associated with the STA; and updating the OBSS PD threshold for SR based on the feedback information.

In another embodiment, a STA is provided, comprising a processor and a transceiver operably coupled to the processor. The processor is configured to determine whether the STA changed an OBSS PD threshold for SR. The transceiver is configured to obtain, based on a determination that the STA changed the OBSS PD threshold for SR, feedback information for performance indicators associated with the STA. The processor is further configured to update the OBSS PD threshold for SR based on the feedback information.

In yet another embodiment, an access point (AP) is provided, comprising a processor and a transceiver operably coupled to the processor. The processor is configured to determine whether a STA associated with the AP changed an OBSS PD threshold for SR. The transceiver is configured to obtain, based on a determination that the STA changed the OBSS PD threshold for SR, feedback information for performance indicators associated with the STA. The processor is further configured to update the OBSS PD threshold for SR based on the feedback information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that the IEEE 802.11ax standard provides a new mode of operation, OBSS PD, which allows a STA (or AP) to transmit over inter-BSS PPDUs by reducing its transmission power to avoid adding interference to the inter-BSS PPDUs. This is done so that efficient re-utilization of spectrum is achieved while limiting inter-BSS interference. The standard does not dictate how this threshold is chosen and leaves this up to implementation.

Embodiments of the present disclosure further recognize that there are challenges when selecting the OBSS PD threshold for any given STA. For example, setting the OBSS PD threshold too low when close to the AP can lead to a lower throughput due to inefficient spectrum utilization. At the same time, setting the OBSS PD threshold too high when far from the AP can lead to lower throughput due to low modulation and coding scheme (MCS), high retransmission rate, or high packet failure, due to reduced signal-and-interference to noise ratio (SINR) from lowering the transmission power.

Accordingly, embodiments of the present disclosure provide methods and apparatuses for OBSS PD threshold adaptation based on environmental context and feedback. Embodiments of the present disclosure also provide methods and apparatuses for enabling (or triggering) and disabling OBSS PD threshold adaptation.

For simplicity, embodiments of the present disclosure discuss OBSS PD as performed by a STA (i.e., a non-AP STA), however it is understood that an AP (i.e., an AP STA) can also perform OBSS PD. It is also understood that non-AP STAs and AP STAs are both IEEE 802.11 node devices (or nodes), which may also be referred to as WI-FI node devices (or nodes). Accordingly, discussion herein below of actions performed by a STA may be performed by any appropriate IEEE 802.11 node.

Figure 1:
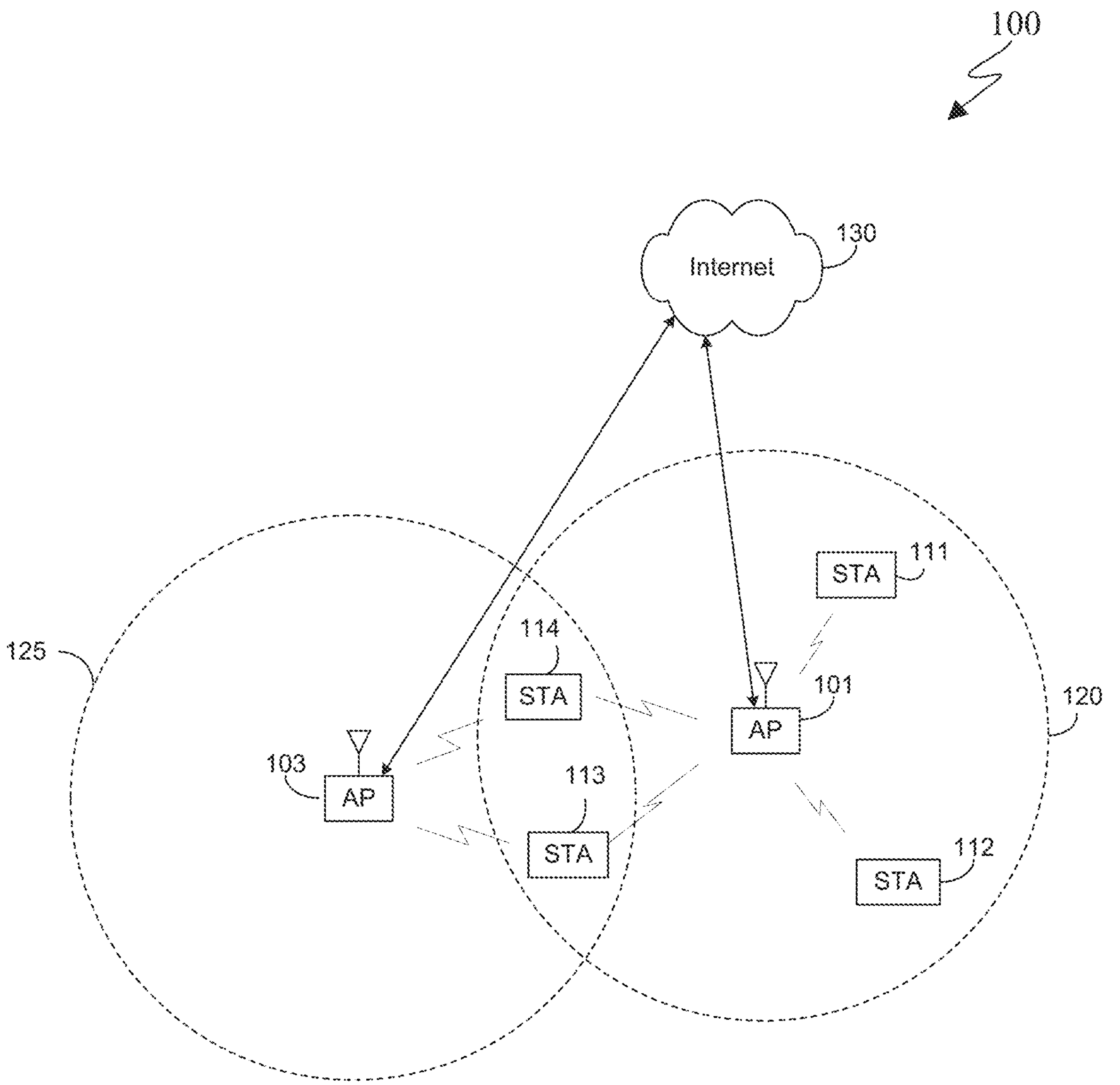
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating OBSS PD threshold adaptation based on environmental context and feedback. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
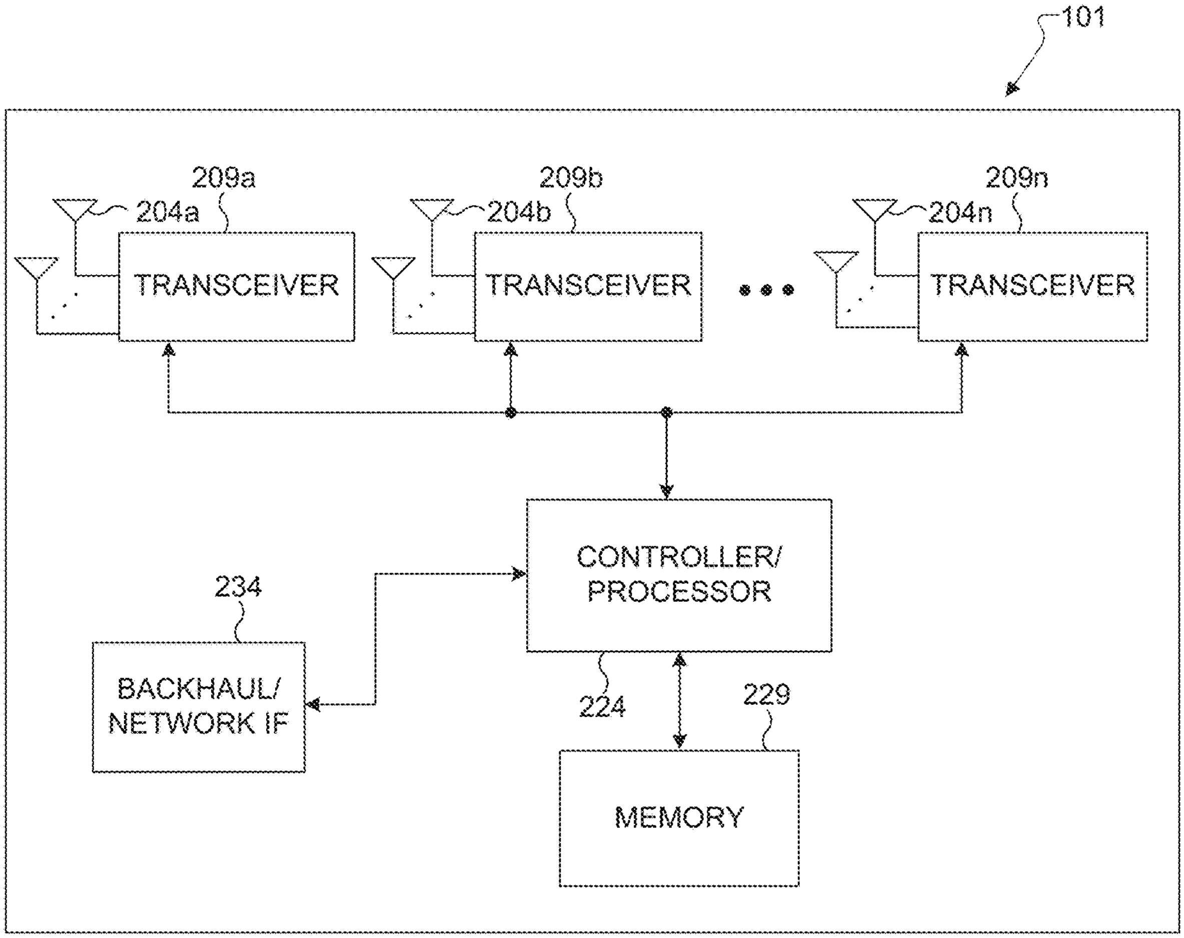
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/ processor 224 including facilitating OBSS PD threshold adaptation based on environmental context and feedback. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating OBSS PD threshold adaptation based on environmental context and feedback. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
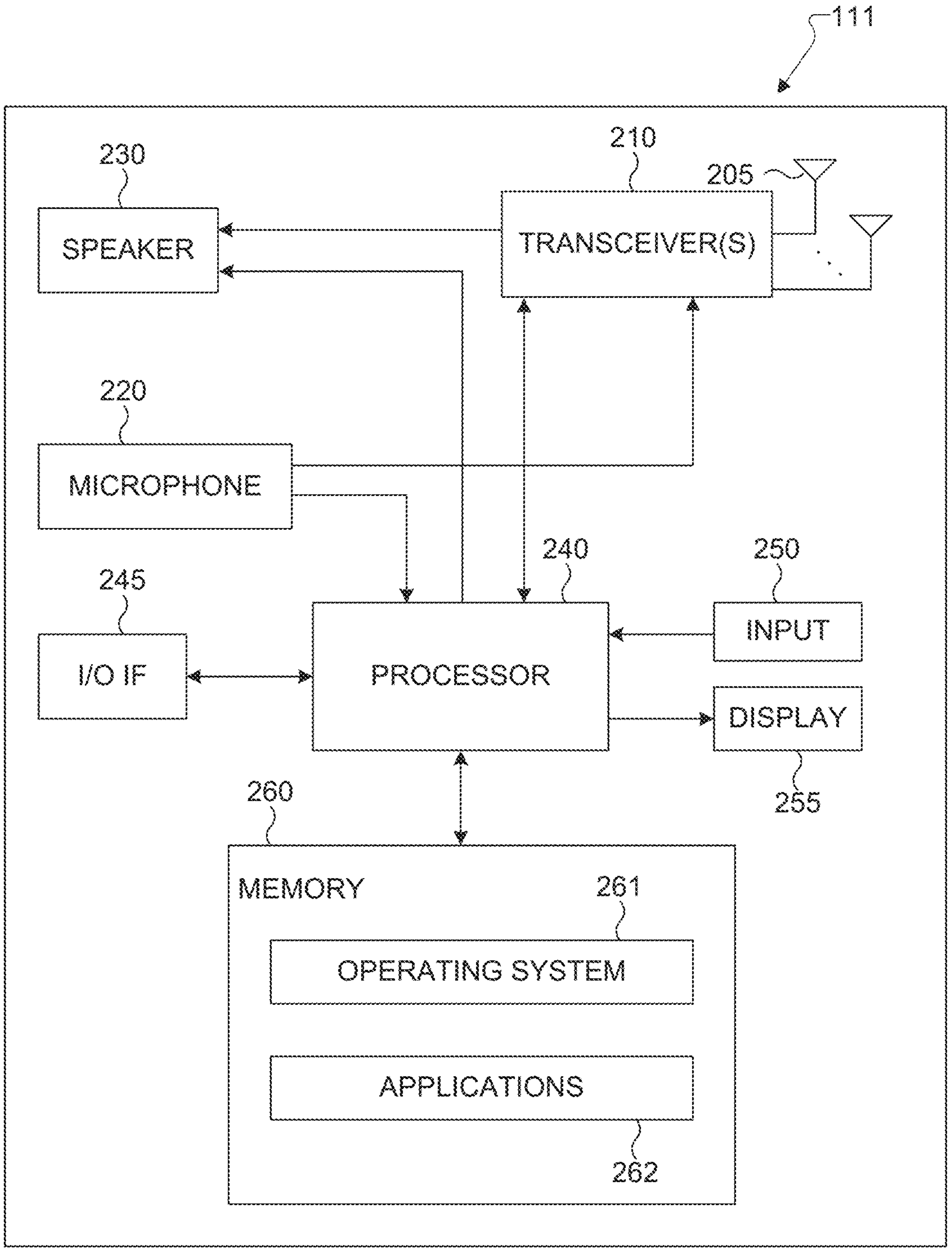
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate OBSS PD threshold adaptation based on environmental context and feedback. In some embodiments, the processor 240 includes at least one microprocessor or microcontroller.

The processor 240 is also capable of executing other processes and programs resident in the memory 260, such as operations for facilitating OBSS PD threshold adaptation based on environmental context and feedback. The processor 240 can move data into or out of the memory 260 as required by an executing process. In some embodiments, the processor 240 is configured to execute a plurality of applications 262, such as applications for facilitating OBSS PD threshold adaptation based on environmental context and feedback. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
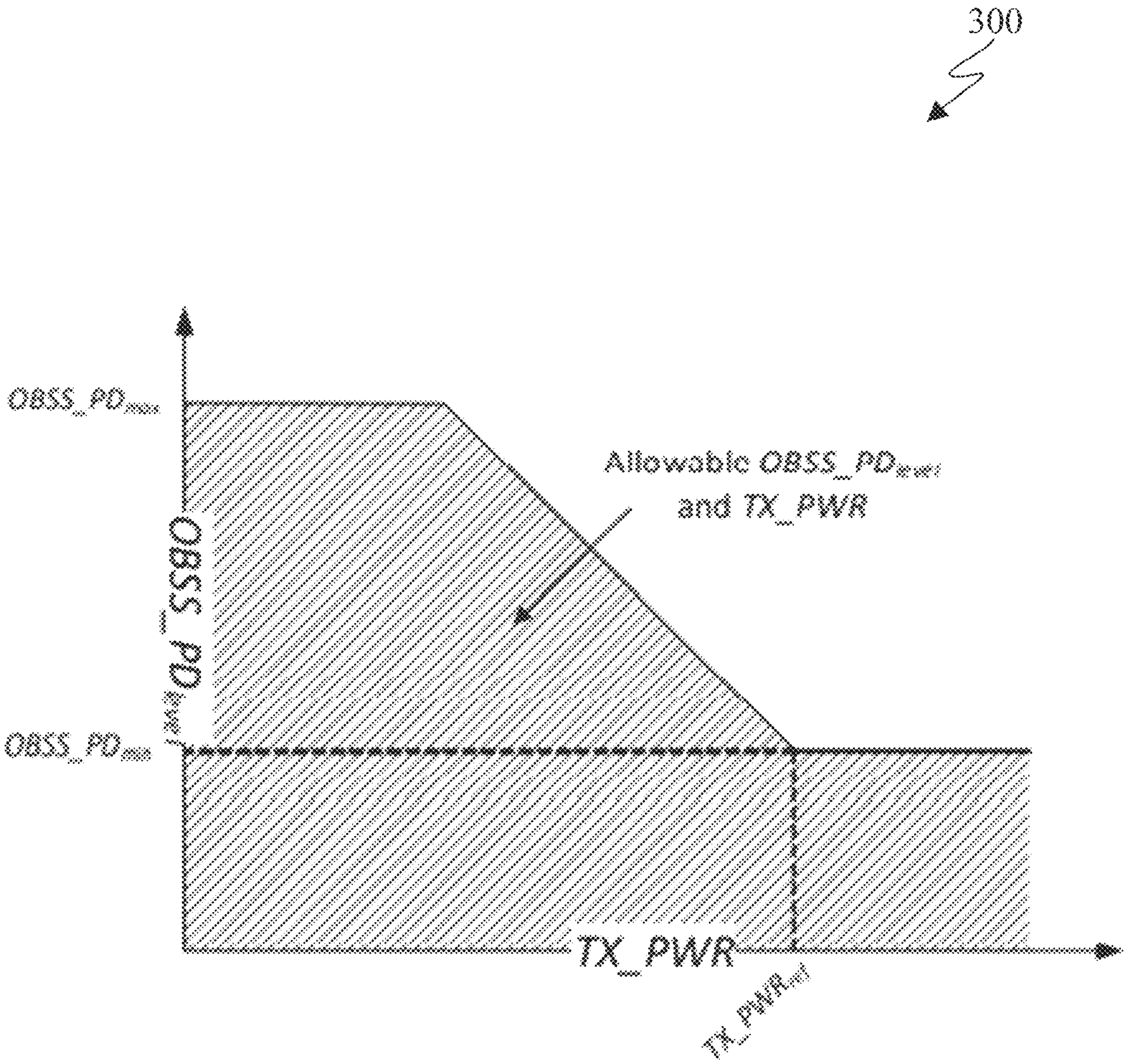
FIG. 3 illustrates an example graph of the relationship between transmit power and OBSS PD threshold according to various embodiments of the present disclosure.

FIG. 3 illustrates an example graph of the relationship between transmit power and OBSS PD threshold according to various embodiments of the present disclosure. The graph of FIG. 3 represents the following equation used to calculate the reduced transmit power, TX_PWR, based on the OBSS PD threshold, $OBSS\_PD_{level}$:

$$TX\_PWR = TX\_PWR_{ref} - (OBSS\_PD_{level} - OBSS\_PD_{min}) + \log_{10}\left(\frac{PPDU\_BW}{20MHz}\right)$$

where $OBSS\_PD_{max} \geq OBSS\_PD_{level} >$ $OBSS\_PD_{min}$, $OBSS\_PD_{max} = -62$ dBm, and $OBSS\_PD_{min} = -82$ dBm for a PPDU_BW of 20 MHz.

Figure 4:
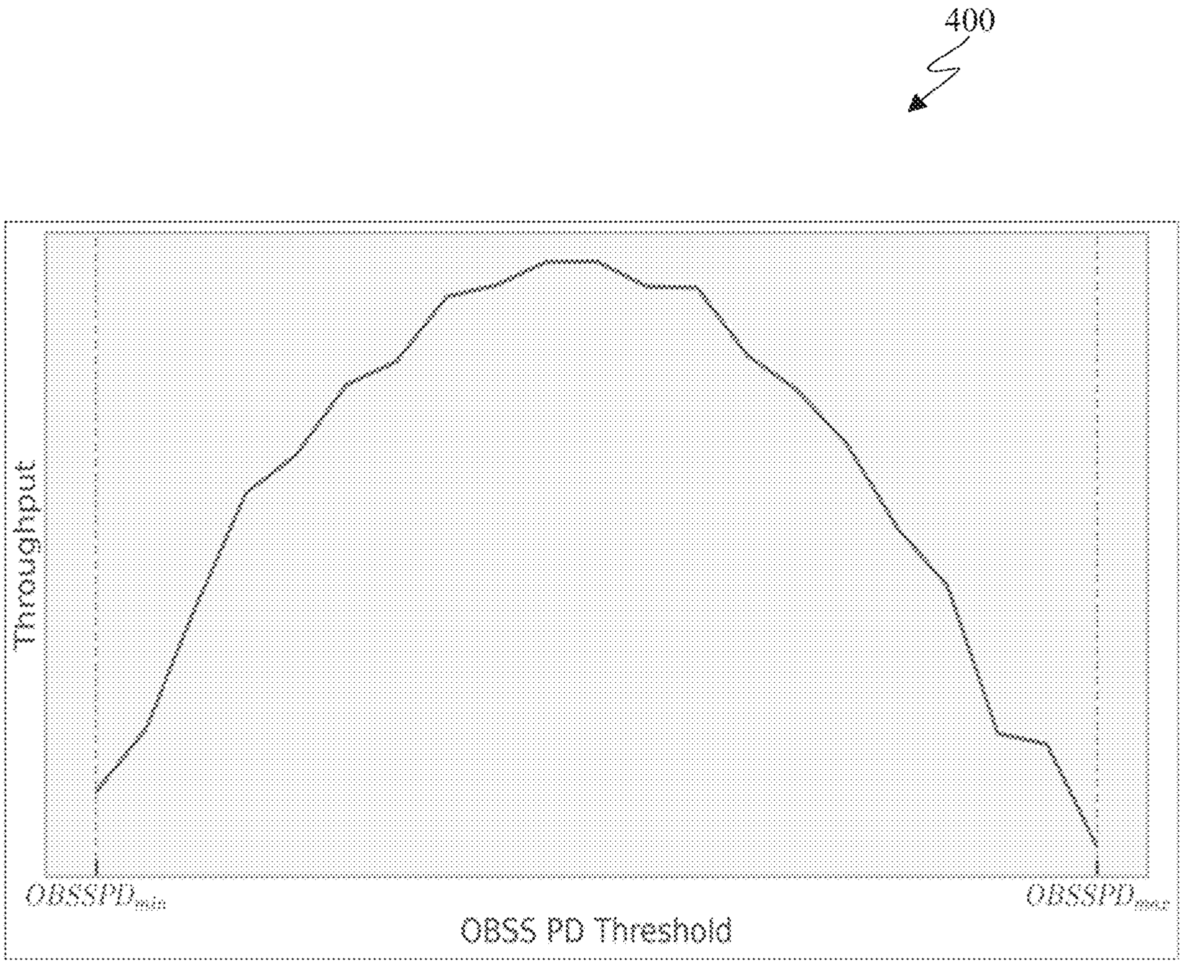
FIG. 4 illustrates an example of variation of throughput due to changing the OBSS PD threshold according to various embodiments of the present disclosure.

FIG. 4 illustrates an example of variation of throughput due to changing the OBSS PD threshold according to various embodiments of the present disclosure. This is just an example and does not represent the majority of cases. As discussed herein above, there are challenges when selecting the OBSS PD threshold for use with OBSS PD operation. There is a tradeoff between channel access opportunities and transmit power that is necessitated, and OBSS PD also introduces a tradeoff between enhancing channel access for the STA and creating interference to transmitted PPDUs in the OBSS. Similarly, optimization of the PD threshold is needed to avoid creating undue interference and unnecessarily lowering throughput.

A solution for optimizing the selected OBSS PD threshold is to consider a STA's link and traffic status along with other environment status (for example, the strength of the OBSS transmission, the distance from any interfering STA/AP and the STA of interest, and the number of overheard OBSSs). Considering all of these factors, a STA can optimize the selection of its OBSS PD threshold within the range allowed by the AP. In addition to the environment, the impact that the selection of the OBSS PD threshold has on the data communication as a feedback mechanism to provide a closed loop approach is considered.

Accordingly, embodiments of the present disclosure describe a feedback based OBSS PD adaptation operating mode, in which the STA performing OBSS PD adaptation will choose an OBSS PD threshold based on the impact of the choice to operation of key performance indicators (KPIs) relevant to the STA. This information is acquired when the STA is performing data communication.

Furthermore, embodiments of the present disclosure describe a combination OBSS PD adaptation operating mode, in which the STA performing OBSS PD adaptation will utilize both a context based operating mode, in which the STA performing OBSS PD adaptation will choose an OBSS threshold based on information about the environment the STA is operating in, in combination with a feedback based OBSS PD adaptation mode to choose an appropriate OBSS PD threshold.

In addition, embodiments of the present disclosure describe a trigger condition to initiate the algorithm when required and remain inactive when the OBSS PD operation provides no gain.

Figure 5:
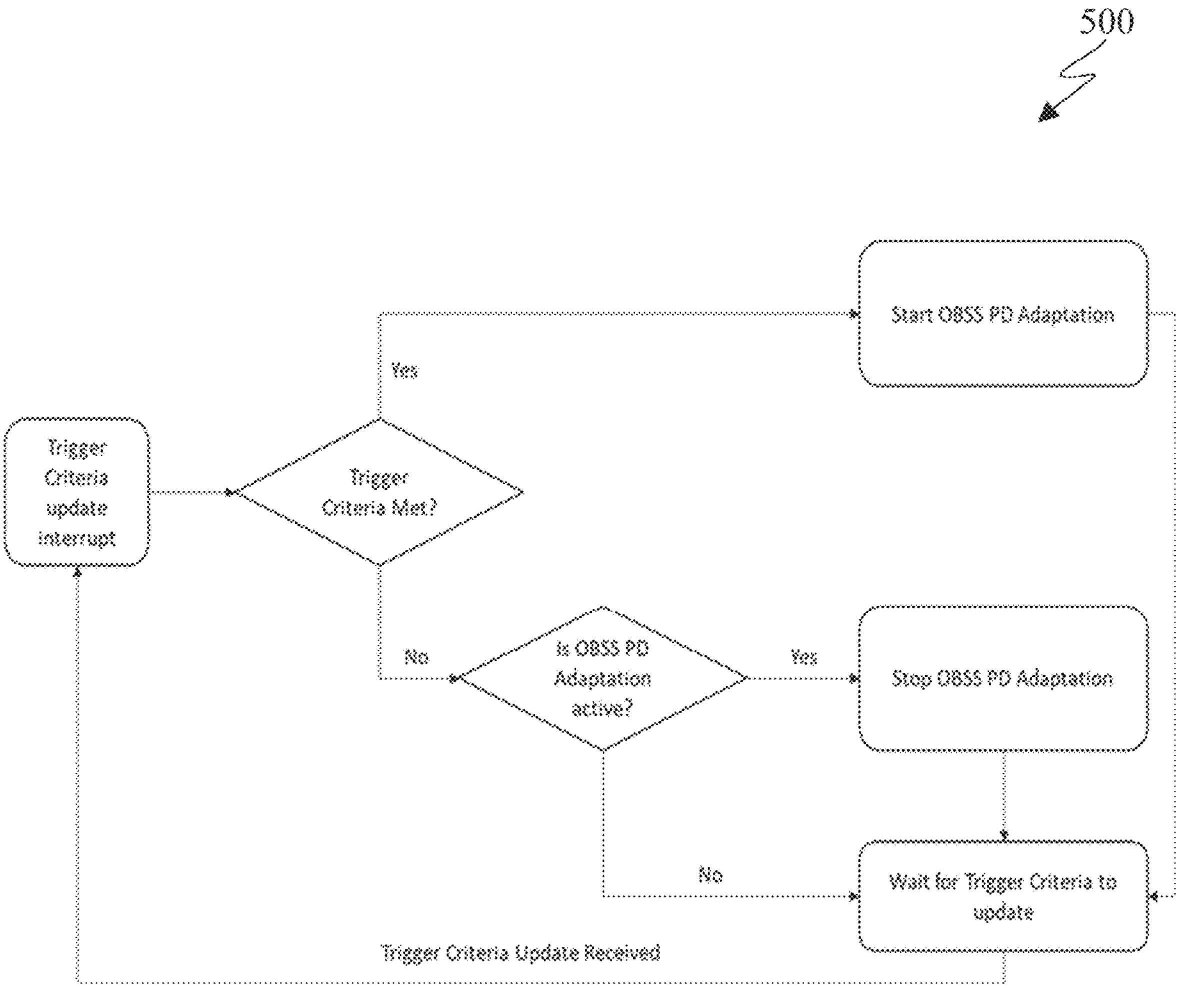
FIG. 5 illustrates an example process for triggering and terminating OBSS PD threshold adaptation according to various embodiments of the present disclosure.

FIG. 5 illustrates an example process for triggering and terminating OBSS PD threshold adaptation according to various embodiments of the present disclosure. In this embodiment, a trigger condition is initially defined as a means of activating OBSS PD adaptation subject to certain criteria. These criteria are observable and measurable by the STA performing the OBSS PD adaptation. The trigger condition can be set as one or a combination of the criteria. An interrupt can be assigned to measuring these criteria and the OBSS PD adaptation algorithm can be initiated or terminated based on the trigger criteria being fulfilled or not. The criteria for triggering the OBSS PD adaptation algorithm include:

The STA is serving traffic for a latency-sensitive application, e.g., a Video Call or Mobile Gaming. This information can either be provided by the application, inferred from observing the foreground or most active application on the STA, inferred from certain peripherals being active on the device used by the application, or through the means of a network service detector classifying traffic on the STA. This information can be gathered from the operating system of the STA based on observing the application ID, foreground application trigger, active application triggers, and application process statistics. OBSS PD adaptation is enabled if a latency-sensitive application is performing data communication.

The throughput generated by an application is greater than the throughput currently served by the STA, which can lead to saturation. Such saturation can be eased by creating more TXOPs (e.g., by using a more aggressive OBSS PD threshold).

The traffic identifier on the MAC Header of traffic generated by an application is marked with a User Priority higher than 3, i.e., the traffic is labelled as belonging to the Voice or Video access category as specified by the 802.11e amendment.

The IETF differentiated services class in the IP header of traffic generated by an application is labeled Expedited Forwarding, Assured Forwarding, or Voice Admit, or the Class Selector of the traffic is labeled above CS3.

The channel utilization of the BSS AP and OBSS AP are above a certain threshold. The channel utilization can be extracted from the BSS Load element of the beacon of the OBSS or BSS AP. As an exemplary value, OBSS PD adaptation operation can be initiated when the channel utilization is above 33% for the AP (at which point the channel may be considered congested).

The ratio of the time the receiver was in the CCA_BUSY state (i.e., sensing the channel as busy) to the time the radio was on is above a certain threshold. As an exemplary value, the OBSS PD adaptation operation can be initiated when the ratio of time the receiver was in CCA_BUSY to the radio being on is above 0.33 (i.e., the receiver detected the channel as occupied 33% of the time that the radio was on).

Figure 6:
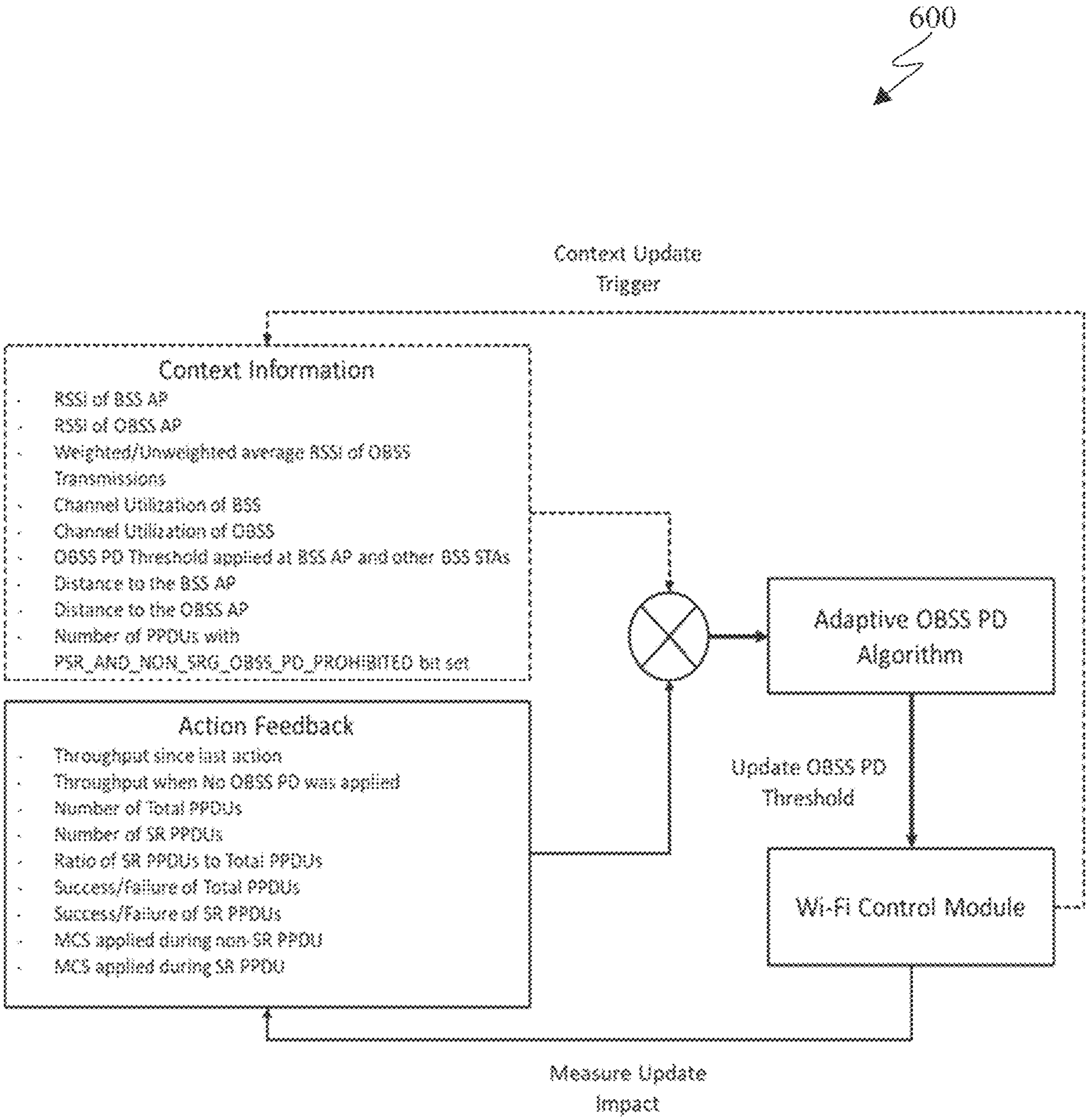
FIG. 6 illustrates an example process for OBSS PD threshold adaptation according to various embodiments of the present disclosure.

FIG. 6 illustrates an example process for OBSS PD threshold adaptation according to various embodiments of the present disclosure. After the algorithm has been triggered, the OBSS PD adaptation can start. The adaptation can work in 3 ways:

1. Context based adaptation
2. Feedback based adaptation
3. Combination adaptation Each of the context based adaptation and feedback based adaptation modules can be run independently by disabling the other one. In case of the combination adaptation, both the context based adaptation and feedback based adaptation modules can be enabled at the summing junction prior to the Adaptive OBSS PD Algorithm block.

Upon receiving the trigger to initiate OBSS PD adaptation, the STA can either begin measuring the network context related information or use existing context related information that is measured periodically to quickly start the adaptation. The network context can be defined as one or more of the following measurements/observations:

The RSSI of the AP to which the STA is associated. This is periodically recorded from the beacon that the AP broadcasts. The higher the BSS AP RSSI, the higher the OBSS PD threshold can be set. For example, the value of the OBSS PD threshold can be set in the following way: if the sensed RSSI from the AP is X dB, then the OBSS PD threshold can be set as X−S−Δ dB, where S is the worst-case scenario SINR and Δ is the power difference between the AP and STA.

The RSSIs of surrounding OBSS APs. This is periodically passively scanned from any beacons received by the STA from OBSS APs, or it can be actively solicited by sending out a probe request. The higher the OBSS RSSIs, the higher the OBSS PD threshold needs to be set to transmit over OBSS PPDUs. For example, the value of the OBSS PD threshold can be set in the following way: if all of the OBSS RSSI transmissions are above Y dB, and $Y \in (-82, -62]$, then setting an OBSS PD threshold below Y dB will provide no gain. Therefore, the OBSS PD threshold value should be set above Y dB.

The weighted or unweighted average (or mean) of OBSS RSSI transmissions. For any preamble that is decoded by the STA of any transmission in the OBSS channel, the RSSI is categorized based on belonging to that respective OBSS. In an unweighted average, the average is calculated over all OBSS RSSIs that are encountered. In a weighted average, the average is calculated per OBSS, then a global average is calculated by providing individual weights to each respective OBSS subject to the number of PPDUs it has transmitted. This can simply be the number of PPDUs transmitted from a particular OBSS divided by all OBSS PPDUs. This can allow setting the OBSS PD threshold based on the number of OBSS PPDUs that can be transmitted over rather than the overall OBSS RSSI. To calculate the average OBSS RSSI, the STA can set a time window for averaging to a fixed time interval or N Target Beacon Transmission Times (TBTTs). As an example, the average can be calculated every 500 ms in one embodiment, and in 5 TBTTs in another. The OBSS PD threshold can be set to the calculated average value.

The Channel Utilization of the BSS AP. This field can be found in the BSS Beacon in the BSS Load element. If the Channel Utilization of the BSS AP is low, then the OBSS PD threshold can be lowered or the OBSS PD SR operation can be disabled. If there are not many transmissions in the medium to transmit over, then enabling OBSS PD provides minimal gain so it can be disabled. As an example, if the channel utilization is below 25%, then OBSS PD SR can be disabled.

The Channel Utilization of the OBSS APs. This field can be found in the BSS Beacon in the BSS Load element. If the Channel Utilization of the OBSS APs is low, then the OBSS PD threshold can be lowered or the OBSS PD operation can be disabled. Similar to the above metric, if the channel utilization by all OBSS APs is low, then the gain provided by OBSS PD is minimal. If the OBSS APs also sense that the channel is under occupied, then OBSS PD SR can be disabled. As an example, if the OBSS AP channel utilization is below 25%, then OBSS PD can be disabled.

The OBSS PD threshold applied at the BSS AP and other BSS STAs. The BSS can broadcast a suggested OBSS PD threshold to all of the associated STAs and also provide feedback in terms of what is currently utilized by the AP. This can be used as an initial OBSS PD threshold value to be adjusted based on separate context information. This value is obtained from the Spatial Reuse Parameter Set element in the OBSS PD Margin field and is subtracted from the Beacon RSSI to set the OBSS PD value.

The distance to the BSS AP. This can be found by using WI-FI fine time measurements round-trip time (RTT), WI-FI CSI-based localization, or other wireless localization technologies employed by the AP (e.g., BLUETOOTH, ultra-wideband, etc.). The farther away the BSS AP is from the STA, the lower the OBSS PD threshold will need to be set. As the STA moves further away from the AP, the received power of transmissions from the STA to the AP will also decrease and this can decrease the SINR, causing low transmit speeds and packet failures. The STA can then create a mapping from distance to power using the path loss model. The path loss value can then be used as a reference to set the OBSS PD threshold to maintain required SINR similar to the way that the RSSI of the BSS AP can be used.

The distance to the OBSS AP. This can be requested from the OBSS AP in a similar manner as it can be requested from the BSS AP. The farther away the OBSS AP is from the STA, the lower the OBSS PD threshold can be set. Similar to the above, using a path loss model, the received signal from the OBSS APs participating in RTT can be mapped using the obtained distance. Then the path loss value can be used as a reference to calculate the OBSS PD threshold similar to the way that the RSSIs of OBSS APs can be used.

The number of PPDUs with the PSR_AND_NON_SRG_OBSS_PD_PROHIBITED bit set. This can be taken as an absolute value or as a relative value in comparison to the total number of PPDUs observed (i.e., a ratio of the two numbers). If the absolute value or ratio is high, the chances of successfully performing SR may decrease and the operation can be disabled.

In one embodiment, the OBSS PD threshold is set as:

$$\text{OBSS\_PD} = \begin{cases} OBSS_{RSSI} + 1, & OBSS_{RSSI} < BSS_{RSSI} \\ \text{OBSS\_PD}_{MIN}, & \text{else} \end{cases}$$

where $OBSS_{RSSI}$ can represent any one of, or a combination of: the average of the OBSS RSSI received from all OBSS APs, the unweighted average of all OBSS transmissions overheard by the STA, the weighted average of all OBSS transmissions overheard by the STA, the OBSS RSSI of the AP that has a high channel utilization (or the highest channel utilization), the OBSS RSSI of the AP closest to the STA, and the OBSS RSSI of the APs that have the least number of PPDUs with the PSR_AND_NON_SRG_OBSS_PD_PROHIBITED bit set. The STA can create an interrupt based on any changes to these measurements and if any one of them changes, the context-based PD threshold adaptation can repeat again and adapt the OBSS PD threshold.

In the feedback based OBSS PD adaptation, the impact that changing the OBSS PD threshold has on measurements directly related to the STA performing the adaptation are measured. These measurements can be taken as control parameters or rewards for any feedback or reinforcement learning based algorithms that can be used to adapt the OBSS PD threshold. The feedback measurements can be defined as:

The throughput of the STA since the last OBSS PD adaptation/algorithm start. These can be measured periodically or can be aligned with any deterministic interrupt schedule e.g., N number of beacons. The higher the throughput the better. A higher throughput enables faster responsiveness for the application.

The throughput when OBSS PD was not applied in the previous time window, an exemplary value of which is 1 second. In any of the periodic updates, the OBSS PD operation can be disabled or the OBSS PD threshold can be set to $OBSSPD_{MIN}$ and the throughput during that period can be evaluated. This measurement can be used as a reference for the feedback/reward that uses throughput to see how the throughput varies as compared to when no OBSS PD based spatial reuse is used. The higher the reference value, the better. A higher reference value signifies that the current system is able to perform better without OBSS PD.

The number of total PPDUs transmitted. This measurement can also be used as a normal metric, or a reference metric compared to when no OBSS PD based spatial reuse is used. The higher the value, the better. The greater number of PPDUs transmitted indicates a higher channel access rate for the node.

The number of Spatial Reuse PPDUs. This is the number of PPDUs that are sent using the OBSS PD based SR. The higher the count, the better. A higher count of Spatial Reuse PPDUs signals that OBSS PD is enabling additional channel access and providing gain.

The ratio of SR PPDUs to Total PPDUs. This is a number used to find how effective spatial reuse is. The ratio shows that a significant of channel access is provided due to SR. The higher the ratio, the better. A higher ratio indicates that the amount of channel access done using OBSS PD is a significant portion and working as expected.

The Success/Failure of Total PPDUs. This is defined as the number of PPDUs that have been successfully received at the destination/failed to reach the destination. In this measurement, the higher the success/the lower the failure, the better. A lower failure rate signifies that the channel access is efficient and may not be retried multiple times to transmit a single PPDU.

The Success/Failure of SR PPDUs. This is defined as the number of SR PPDUs that have been successfully received at the destination/failed to reach the destination. In this measurement, the higher the success/the lower the failure, the better. A lower failure rate signifies that the channel access using OBSS PD is efficient and an apt OBSS PD threshold may be utilized in various embodiments.

The MCS applied during SR PPDU. This is defined as the modulation scheme used during the OBSS PD channel access. The higher MCS used, the better. The MCS here can be the most used MCS, the average MCS or the most recently used MCS during OBSS PD based channel access. A higher MCS allows higher throughput per channel access or less time to transmit a fixed amount of data. Higher MCS during OBSS PD signifies that the threshold chosen is optimal for channel access.

The MCS applied during non-SR PPDU. This is defined as the modulation scheme used during the non OBSS PD based channel access. This value can be used to compare the MCS applied during SR PPDU to see if the channel access does contribute significantly to the overall throughput or not. The higher the ratio, the better. The MCS values used here can be the most used, average MCS or most recently used MCS. A higher MCS during non-OBSS PD based channel access signifies that the OBSS PD may not be providing significant gain and can be switched off.

The feedback value/reward value chosen from these measurements can be either one or any combination of these values. Once the feedback/reward has been chosen, an algorithm that maximizes or minimizes the measurements to reach the optimal OBSS PD value can be used.

In one embodiment, a reinforcement learning approach can be used to maximize the reward value. An example of that can be using the Multi Armed Bandit approach. In this approach, the problem can be formulated as:

The number of arms of the MAB algorithm is represented by the OBSS PD threshold being used. As an example, in one embodiment each 1 dB increment between −82 to −62 is used as 1 arm for a 20 MHz bandwidth. As the PPDU being transmitted at a higher bandwidth, the threshold can be adjusted accordingly The reward for the MAB algorithm can be determined as any or a combination of the feedback measurements described beforehand. In one embodiment, the throughput obtained between one periodic interval while operating with the current OBSS PD threshold can be taken as a reward value for the MAB. In another embodiment, the relative gain when compared to the throughput obtained at $OBSSPD_{MIN}$ can be used as the reward.

The MAB algorithm used in this context can be any of the algorithms from the MAB family to perform the OBSS PD adaptation. The specific algorithm to use can be determined at the discretion of the implementation but the underlying steps used would be the same.

In one embodiment, the Upper Confidence Bound (UCB) algorithm can be used to adapt to the optimal OBSS PD threshold. In the UCB algorithm, the arm $K_t$ chosen at time instance t is under the following conditions:

$$K_t = \underset{k}{\operatorname{argmax}} \left[ Q_t(k) + c\sqrt{(\log\, t)/N_t(k)} \right]$$

where, k are all the arms available to the MAB, $Q_t(k)$ is the sample mean of the reward till time t, c is the confidence factor or upper bound hyperparameter of the algorithm, and $N_t(k)$ is the count of times the arm k has been used till time t. The sample mean is calculated as $$Q_{t+1}(k) = \left(1 - \frac{1}{N_t(k)+1}\right) * Q_t(k) + \left(\frac{1}{N_t(k)+1}\right) * R$$

where, R is the reward received at time t+1 for choosing arm k.

In alternate embodiments, the MAB algorithm can be replaced with Thompson Sampling, Epsilon Greedy, Gaussian Process UCB or other algorithms.

In case of non-stationary scenarios, the sample mean can be replaced with an exponentially weighted average mean which can accommodate for changes in the environment by accommodating for the latest reward in one embodiment. In an alternate embodiment, the sample mean can be calculated over a finite time horizon instead of infinitely by storing a time-based queue in which the rewards observed beyond some time horizon are no longer used in the sample mean calculation.

The context-based adaptation and the feedback-based adaptation can work standalone, but they can also be used coherently to exploit each other's information and provide additional gain and balance.

The OBSS PD Threshold that the context module chooses can be used as the initial arm for exploration using the feedback module in one embodiment. If the context module generates multiple OBSS PD Thresholds, then those can be chosen as the initial set of arms to explore. Here the definition of the arm is similar to that described herein, the threshold chosen in dB for channel access using OBSS PD.

In one embodiment, the context module can reduce the search space for the feedback module by providing information of the number of arms to iterate over. In this case, the MAB algorithm will use the arms that are close to the observed OBSS RSSI values instead of all the possible OBSS PD threshold values.

$$OBSS'_{RSSI} = [OBSS_{RSSI} \geq OBSS_{MIN}, OBSS_{RSSI} \leq OBSS_{MAX}]$$

where $OBSS'_{RSSI}$ is the set of values observed by the STA that lie between the maximum and minimum allowed OBSS PD values. In this case the number of arms can be reduced by setting the search space of all possible arms k to $$k \in [\min(OBSS'_{RSSI}) + 1, \max(OBSS'_{RSSI}) + 1]$$

In case of some scenarios where OBSS PD adaptation does not provide any gain to not using OBSS PD or the reward becomes negative when compared to the $OBSSPD_{MIN}$ arm, the OBSS PD adaptation can be disabled. This can happen due to very low SINR when using OBSS PD due to reduced transmission power, or not enough PPDUs in the environment to transmit over. The context module can provide this information to the algorithm module and disable the adaptation.

Figure 7:
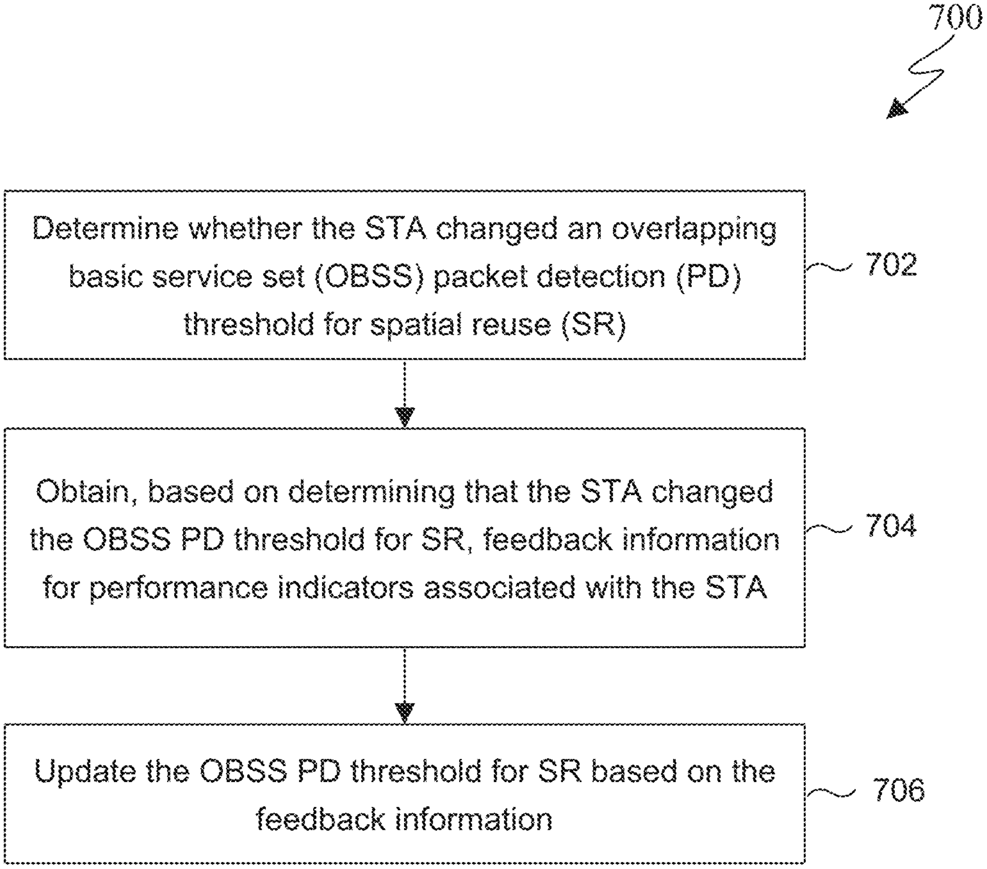
FIG. 7 illustrates an example process for OBSS PD threshold adaptation based on environmental context and feedback according to various embodiments of the present disclosure.

FIG. 7 illustrates a flowchart of a method 700 for wireless communication performed by a station (STA) according to embodiments of the present disclosure. The embodiment of the example method 700 shown in FIG. 7 is for illustration only. Other embodiments of the example method 700 could be used without departing from the scope of this disclosure.

As illustrated in FIG. 7, the method 700 begins at step 702, where the STA determines whether the STA changed an overlapping basic service set (OBSS) packet detection (PD) threshold for spatial reuse (SR). At step 704, the STA obtains, based on determining that the STA changed the OBSS PD threshold for SR, feedback information for performance indicators associated with the STA. At step 706, the STA updates the OBSS PD threshold for SR based on the feedback information.

In one embodiment, the feedback information is associated with at least one of a throughput of the STA, a number of physical layer protocol data units (PPDUs), a number of SR PPDUs, and a modulation coding scheme (MCS).

In one embodiment, the feedback information comprises control parameters or rewards used to adapt the OBSS PD threshold for SR.

In one embodiment, a multi-armed bandit procedure is used to maximize a reward value used to adapt the OBSS PD threshold for SR.

In one embodiment, an upper confidence bound procedure is used to maximize a reward value used for the updating of the OBSS PD threshold for SR.

In one embodiment, a Thompson Sampling, Epsilon Greedy, or Gaussian Process Upper Confidence Bound procedure is used to maximize a reward value used to adapt the OBSS PD threshold for SR.

In one embodiment, the STA obtains, based on transmissions from nodes in at least one of a basic service set (BSS) or an overlapping BSS (OBSS), network context information for a network environment around an access point (AP) associated with the STA; and updates the OBSS PD threshold for SR based on both the network context information and the feedback information.

The above flowchart illustrates an example method that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of wireless communication performed by a station (STA), the method comprising:

determining whether the STA changed an overlapping basic service set (OBSS) packet detection (PD) threshold for spatial reuse (SR);

obtaining, based on determining that the STA changed the OBSS PD threshold for SR, feedback information for performance indicators associated with the STA;

measuring an impact that changing the OBSS PD threshold has on the performance indicators associated with the STA; and updating the OBSS PD threshold for SR based on the feedback information and the measured impact.

2. The method of claim 1, wherein the feedback information is associated with at least one of a throughput of the STA, a number of physical layer protocol data units (PPDUs), a number of SR PPDUs, and a modulation coding scheme (MCS).

3. The method of claim 1, wherein the feedback information comprises control parameters or rewards used to adapt the OBSS PD threshold for SR.

4. The method of claim 3, further comprising using a multi-armed bandit procedure to maximize a reward value used to adapt the OBSS PD threshold for SR.

5. The method of claim 3, further comprising using an upper confidence bound procedure to maximize a reward value used for the updating of the OBSS PD threshold for SR.

6. The method of claim 3, further comprising using a Thompson Sampling, Epsilon Greedy, or Gaussian Process Upper Confidence Bound procedure to maximize a reward value used to adapt the OBSS PD threshold for SR.

7. The method of claim 1, further comprising:

obtaining, based on transmissions from nodes in at least one of a basic service set (BSS) or an overlapping BSS (OBSS), network context information for a network environment around an access point (AP) associated with the STA; and updating the OBSS PD threshold for SR based on the network context information, the feedback information, and the measured impact.

8. A station (STA) comprising:

a processor configured to determine whether the STA changed an overlapping basic service set (OBSS) packet detection (PD) threshold for spatial reuse (SR); and a transceiver operably coupled to the processor, the transceiver configured to obtain, based on a determination that the STA changed the OBSS PD threshold for SR, feedback information for performance indicators associated with the STA, wherein the processor is further configured to;

measure an impact that changing the OBSS PD threshold has on the performance indicators associated with the STA; and update the OBSS PD threshold for SR based on the feedback information and the measured impact.

9. The STA of claim 8, wherein the feedback information is associated with at least one of a throughput of the STA, a number of physical layer protocol data units (PPDUs), a number of SR PPDUs, and a modulation coding scheme (MCS).

10. The STA of claim 8, wherein the feedback information comprises control parameters or rewards used to adapt the OBSS PD threshold for SR.

11. The STA of claim 10, wherein the processor is further configured to use a multi-armed bandit procedure to maximize a reward value used to adapt the OBSS PD threshold for SR.

12. The STA of claim 10, wherein the processor is further configured to use an upper confidence bound procedure to maximize a reward value used for to update the OBSS PD threshold for SR.

13. The STA of claim 10, wherein the processor is further configured to use a Thompson Sampling, Epsilon Greedy, or Gaussian Process Upper Confidence Bound procedure to maximize a reward value used to adapt the OBSS PD threshold for SR.

14. The STA of claim 8, wherein:

the transceiver is further configured to obtain, based on transmissions from nodes in at least one of a basic service set (BSS) or an overlapping BSS (OBSS), network context information for a network environment around an access point (AP) associated with the STA; and the processor is further configured to update the OBSS PD threshold for SR based on the network context information, the feedback information, and the measured impact.

15. An access point (AP) comprising:

a processor configured to determine whether a station (STA) associated with the AP changed an overlapping basic service set (OBSS) packet detection (PD) threshold for spatial reuse (SR); and a transceiver operably coupled to the processor, the transceiver configured to obtain, based on a determination that the STA changed the OBSS PD threshold for SR, feedback information for performance indicators associated with the STA, wherein the processor is further configured to:

measure an impact that changing the OBSS PD threshold has on the performance indicators associated with the STA; and update the OBSS PD threshold for SR based on the feedback information and the measured impact.

16. The AP of claim 15, wherein the feedback information is associated with at least one of a throughput of the STA, a number of physical layer protocol data units (PPDUs), a number of SR PPDUs, and a modulation coding scheme (MCS).

17. The AP of claim 15, wherein the feedback information comprises control parameters or rewards used to adapt the OBSS PD threshold for SR.

18. The AP of claim 17, wherein the processor is further configured to use a multi-armed bandit procedure or an upper confidence bound procedure to maximize a reward value used to adapt the OBSS PD threshold for SR.

19. The AP of claim 17, wherein the processor is further configured to use a Thompson Sampling, Epsilon Greedy, or Gaussian Process Upper Confidence Bound procedure to maximize a reward value used to adapt the OBSS PD threshold for SR.

20. The AP of claim 15, wherein:

the transceiver is further configured to obtain, based on transmissions from nodes in at least one of a basic service set (BSS) or an overlapping BSS (OBSS), network context information for a network environment around the AP; and the processor is further configured to update the OBSS PD threshold for SR based on the network context information, the feedback information, and the measured impact.

* * * * *